US011707979B2

(12) United States Patent
Cho et al.

(10) Patent No.: US 11,707,979 B2
(45) Date of Patent: Jul. 25, 2023

(54) FUEL PUMP MODULE

(71) Applicants: HYUNDAI MOTOR COMPANY, Seoul (KR); KIA CORPORATION, Seoul (KR)

(72) Inventors: Seong Cheol Cho, Seoul (KR); Ju Tae Song, Hwaseong-si (KR); Sung Won Lee, Hwaseong-si (KR); Se Jin Kim, Sejong-si (KR); Joon Seup Kim, Sejong-si (KR); Hyeong Cheol Yuk, Sejong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 64 days.

(21) Appl. No.: 17/477,853

(22) Filed: Sep. 17, 2021

(65) Prior Publication Data

US 2022/0176811 A1 Jun. 9, 2022

(30) Foreign Application Priority Data

Dec. 9, 2020 (KR) ........................ 10-2020-0171543

(51) Int. Cl.
*B60K 15/03* (2006.01)
*F17C 5/02* (2006.01)

(52) U.S. Cl.
CPC .......... *B60K 15/03006* (2013.01); *F17C 5/02* (2013.01); *B60K 2015/03019* (2013.01); *B60K 2015/03026* (2013.01); *F17C 2205/0335* (2013.01); *F17C 2223/0153* (2013.01); *F17C 2227/0135* (2013.01)

(58) Field of Classification Search
CPC .... B60K 15/03006; B60K 2015/03019; B60K 2015/03026; F17C 5/02; F17C 2205/0335; F17C 2223/0153; F17C 2227/013
USPC ....... 417/176, 168, 179; 137/565.22, 565.34, 137/565.17
See application file for complete search history.

(56) References Cited

U.S. PATENT DOCUMENTS

| | | | | |
|---|---|---|---|---|
| 4,750,513 A | * | 6/1988 | Griffin ................. | F02M 37/106 137/316 |
| 5,394,902 A | * | 3/1995 | Shibao ................. | B60K 15/077 137/565.17 |
| 5,522,425 A | * | 6/1996 | Kroiss .................... | G01F 23/36 137/565.17 |
| 6,206,037 B1 | * | 3/2001 | Murakoshi ........... | F02M 37/106 137/565.22 |
| 6,230,690 B1 | * | 5/2001 | Umetsu ............... | B60K 15/077 123/509 |

(Continued)

FOREIGN PATENT DOCUMENTS

JP 6162183 B2 7/2017

*Primary Examiner* — Angelisa L. Hicks
(74) *Attorney, Agent, or Firm* — Morgan, Lewis & Bockius LLP

(57) ABSTRACT

A fuel pump module which may be easily assembled and mounted in a flat bombe having a small height in an LPG vehicle, may have a structure in which a reservoir cup may be rotated and restored with respect to a plate by support bars and springs, so that the fuel pump module may be easily assembled and mounted even in a flat bombe having a small height. Furthermore, members for blocking noise and absorbing vibration are combined with a fuel pump, so noise and vibration may be reduced when the pump is operated.

19 Claims, 13 Drawing Sheets

(56) References Cited

U.S. PATENT DOCUMENTS

| | | | | |
|---|---|---|---|---|
| 7,556,024 | B2* | 7/2009 | Crary | F02M 37/103 |
| | | | | 123/495 |
| 9,752,543 | B2* | 9/2017 | Ikeya | F02M 37/106 |
| 10,012,189 | B2* | 7/2018 | Kondo | F02M 37/10 |
| 10,704,514 | B2* | 7/2020 | Kobayashi | F02M 37/00 |
| 10,753,328 | B2* | 8/2020 | Murakoshi | F02M 37/103 |
| 2003/0026685 | A1* | 2/2003 | Takagi | F04D 5/002 |
| | | | | 415/55.1 |
| 2016/0123288 | A1* | 5/2016 | Yu | F04D 5/006 |
| | | | | 415/220 |

\* cited by examiner

FIG. 7A
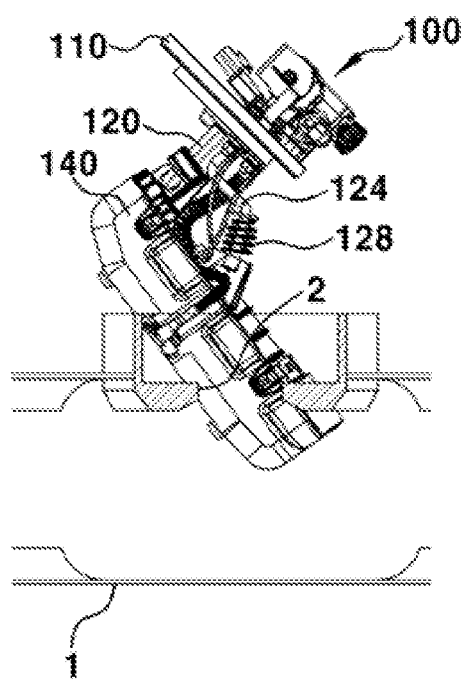
FIG. 7B
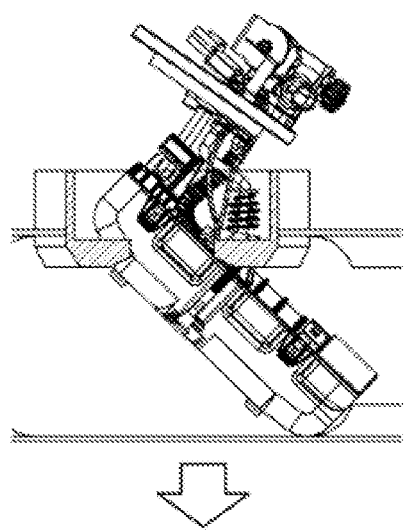
FIG. 7C
FIG. 7D
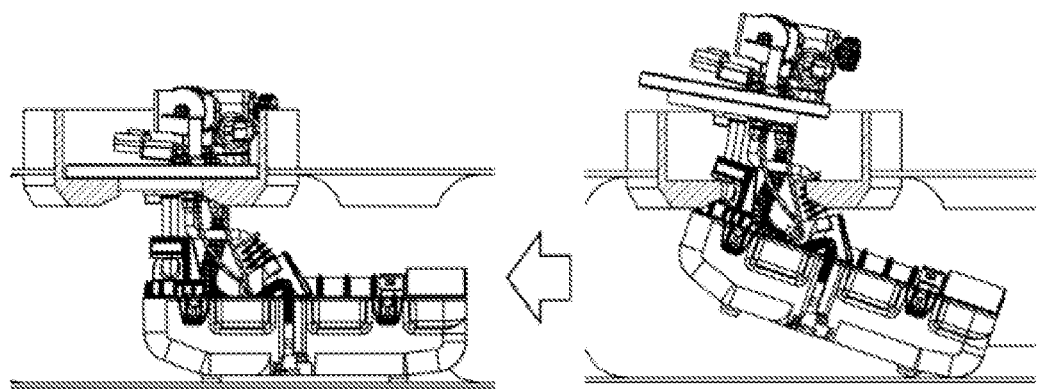

[ BEFORE MOUNTED IN BOMBE ]

[ AFTER MOUNTED IN BOMBE ]

FUEL PUMP MODULE

CROSS REFERENCE TO RELATED APPLICATION

The present application claims priority to Korean Patent Application No. 10-2020-0171543, filed Dec. 9, 2020, the entire contents of which is incorporated herein for all purposes by this reference.

BACKGROUND OF THE INVENTION

Field of the Invention

The present invention relates to a fuel pump module, and more particularly, to a fuel pump module that may be easily assembled and mounted in a flat bombe having a small height in an LPG vehicle.

Description of Related Art

At present, Liquefied Petroleum Gas (LPG) vehicles are being increasingly popularized as a part of following regulation on greenhouse gas such as carbon dioxide and coping with particulate matter.

It is a trend that the height of the under body is gradually decreased to satisfy the recent demands of vehicle design, such as decreasing the overall height and lowering the center of gravity (lowering the center), to secure the spaces in the interior and the trunk, and to secure comfortable staying and sitting (lower the hip point).

It is very difficult to apply existing LPG tanks, which have been used for existing LPG vehicles, to recent vehicles having a low underbody due to the limit in the shape (e.g., a cylindrical shape and a donut shape).

For example, existing LPG bombes are difficult to mount on the lowered underbody in SUVs or RVs. To solve the present problem, the underbody floor, the suspension wheel center, etc. are modified, which, however, costs a great deal.

Furthermore, when existing LPG bombes are provided in the trunk compartment of a vehicle, the load space decreases, so that the commercial value of the vehicles may decrease. However, if the bombes are reduced in size, the total distance to empty of a vehicle decreases, which may also deteriorate the commercial value of the vehicle.

Therefore, it is required to develop a bombe having a new shape to correspond to the layout of vehicles with a reduced underbody, and particularly, it is required to develop a new LPG pump module which may be applied to the bombe with an improved shape.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fuel pump module which may be easily assembled and mounted in a flat bombe having a small height. Various aspects of the present invention are to provide a fuel pump module in which noise and vibration generated in operation may be reduced.

The objectives of the present invention are not limited to those described above and other objectives not stated herein would be apparently understood by those who have ordinary skills in the art that the present invention belongs to (hereafter, 'those skilled in the art') from the following description.

To achieve the objectives of the present invention, a fuel pump module includes: a plate configured to be mounted in an opening of a bombe; a reservoir cup provided in the bombe; a fuel pump mounted in the reservoir cup and supplying fuel into the reservoir cup; a jet pump supplied with the fuel from the fuel pump as working fluid to suction the fuel outside the reservoir cup and discharge the fuel into the reservoir cup; a first support bar having a first end portion fixed by the plate and a second end portion rotatably coupled to the reservoir cup; and a second support bar having a first end portion fixed by the plate and a second end portion inserted into a coupling groove of the reservoir cup.

According to various exemplary embodiments of the present invention, since a reservoir cup may be rotated and restored with respect to a plate by support bars and springs, the fuel pump module may be easily assembled and mounted even in a flat bombe having a small height. The reservoir cup may be stably mounted and fixed on the bottom inside the bombe. Furthermore, since members for blocking noise and absorbing vibration are combined with a fuel pump, noise and vibration may be reduced when the pump is operated.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 and FIG. 8 are views showing a process of installing the fuel pump module according to various exemplary embodiments of the present invention in an LPG bombe;

Figure 1:
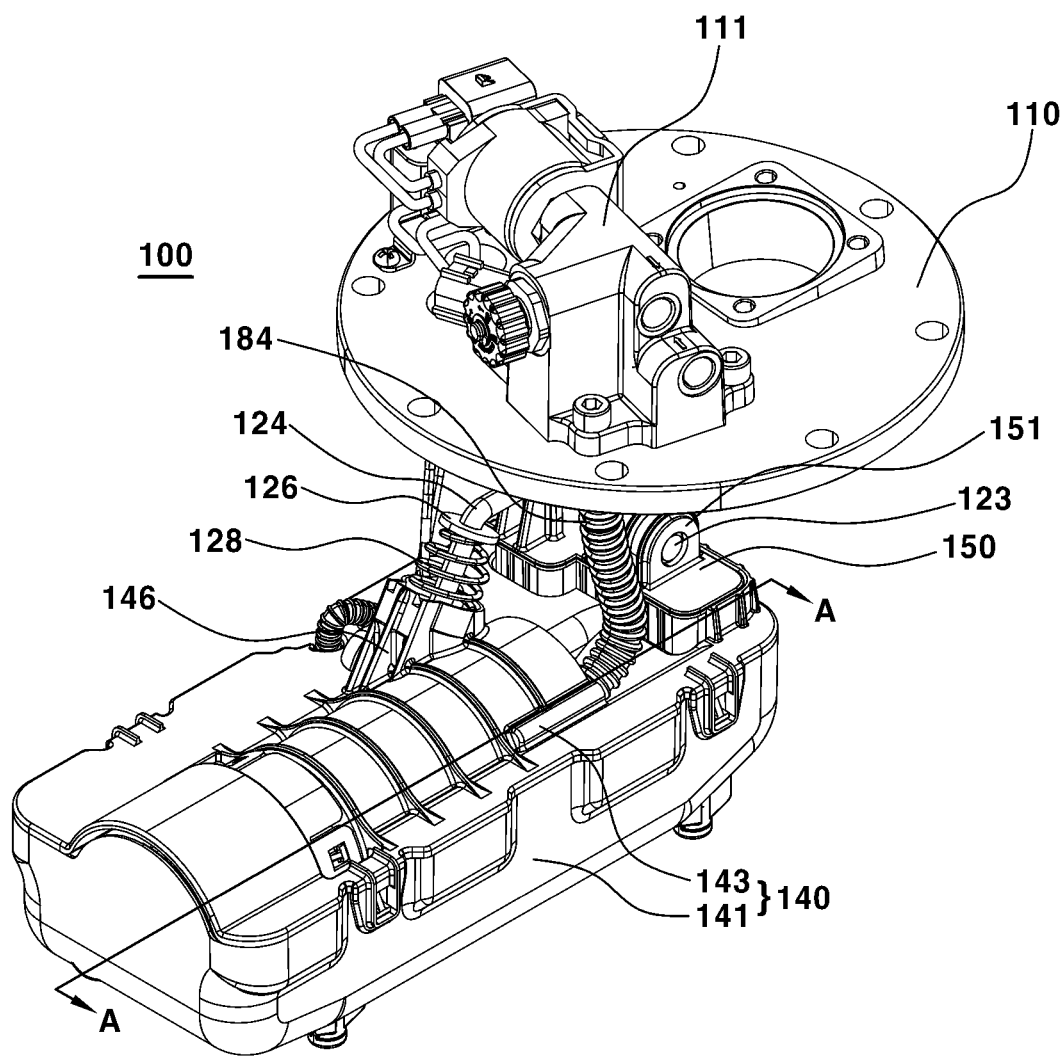
FIG. 1 is an assembled perspective view showing a fuel pump module according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Description of specific structures and functions disclosed in embodiments of the present invention are only an example for describing the exemplary embodiments according to the concept of the present invention and the exemplary embodiments according to the concept of the present invention may be implemented in various ways. The present invention is not limited to the exemplary embodiments described herein and should be construed as including all changes, equivalents, and replacements that are included in the spirit and the range of the present invention.

It will be understood that, although the terms first and/or second, etc. may be used herein to describe various elements, but these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "coupled directly to" another element, it may be connected to or coupled to another element without the other element intervening therebetween. Furthermore, the terms used herein to describe a relationship between elements, that is, "between", "directly between", "adjacent" or "directly adjacent" should be interpreted in the same manner as those described above.

Like reference numerals indicate the same components throughout the specification. The terms used herein are provided to describe embodiments without limiting the present invention. In the specification, a singular form includes a plural form unless specifically stated in the sentences. The terms "comprise" and/or "comprising" used herein do not exclude that another component, step, operation, and/or element exist or are added in the stated component, step, operation, and/or element.

Since the underbody usually is low and has a flat shape in SUVs, RVs, and other common vehicles, there are many limitations in the shape or design of an LPG bombe to satisfy the necessary capacity and related rules. Accordingly, a structure which is mounted on the lower portion of a vehicle by connecting about two to four bombes has been known.

However, an LPG vehicle with a lowered underbody requires a new shape of LPG bombe, and for example, a flat bombe is under development. A fuel pump module (i.e., an LPG pump module) having new shape and configuration is required to apply a flat bombe, and a low profile fuel pump module which may be provided on a flat bombe with a small height is required.

Accordingly, a low profile fuel pump module that has a new shape and configuration and may be provided on a flat bombe is disclosed. A fuel pump module according to various exemplary embodiments of the present invention, which is a turbine type low profile fuel pump module, has a shape with a reduced height to be configured to be mounted and provided in a flat bombe with a small height and may have a flat external shape laterally occupying a wide space.

A horizontal structure in which a fuel pump, a jet pump, a filter, etc. are laterally disposed rather than a vertical structure in which they are disposed up and down may be applied in various exemplary embodiments of the present invention to implement a low profile fuel pump module. A turbine type pump configuration may be applied in consideration of low viscosity of LPG fuel and high-pressure performance may be secured by minimizing a drop of flow rate due to an increase in pressure in the turbine type pump configuration.

In the fuel pump module according to various exemplary embodiments of the present invention, a gauge that detects the remaining fuel amount in a bombe may be provided in an integrated type, and an integrated filter is also provided, whereby it is possible to prevent non-operation of the turbine type pump due to foreign substances mixed in the fuel. The integrated filter, as described below, may have a strainer integrally connected to the fuel pump to filter out foreign substances in the fuel.

In the fuel pump module according to various exemplary embodiments of the present invention, a reservoir cup which may be provided in a bombe with a small height is applied and has a jet pump such that the reservoir cup is always fully filled with fuel, improving stability of fuel supply. Furthermore, a structure that blocks noise and vibration is applied to reduce the high-frequency noise and vibration which is generated by the fuel pump, preventing the noise and vibration of the fuel pump from being transmitted to a passenger sitting on a seat over the bombe through the vehicle body.

Hereinafter, a fuel pump module according to various exemplary embodiments of the present invention is described in detail with reference to the accompanying drawings.

Figure 2:
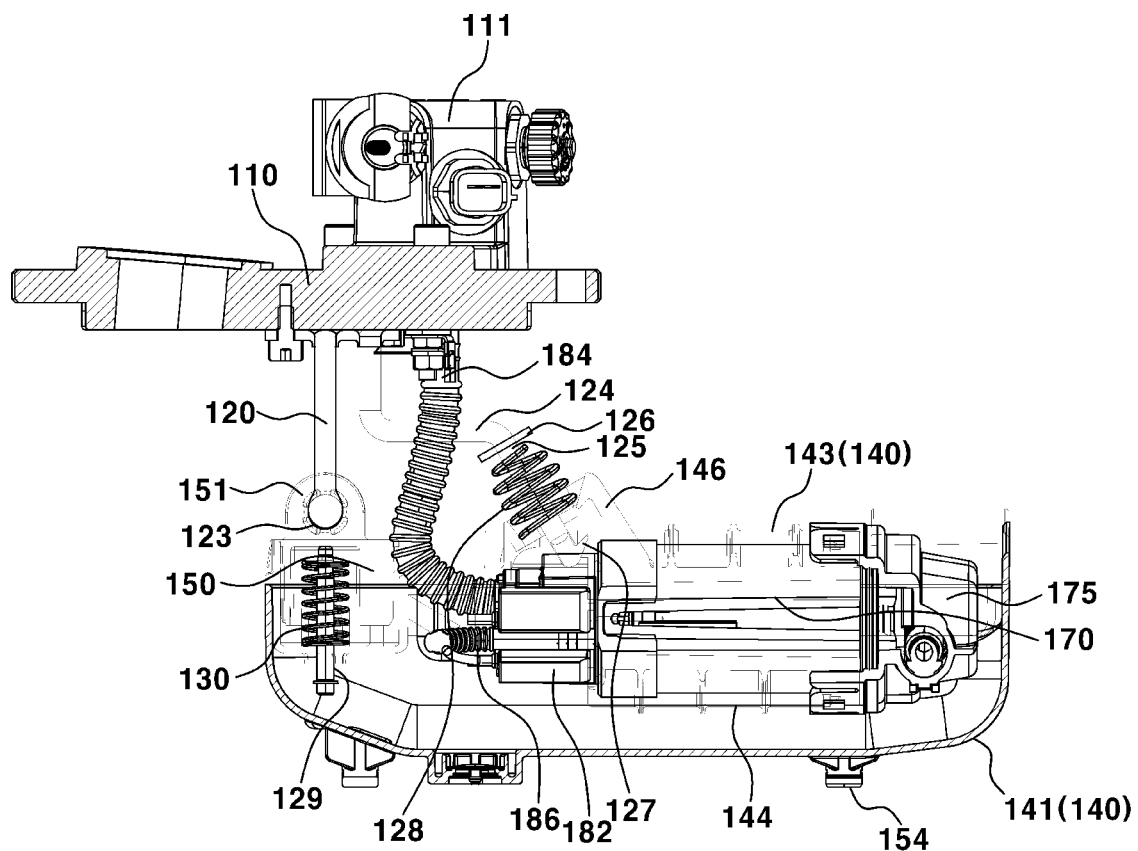
FIG. 2 is a cross-sectional view taken along line A-A shown in FIG. 1.
Figure 3:
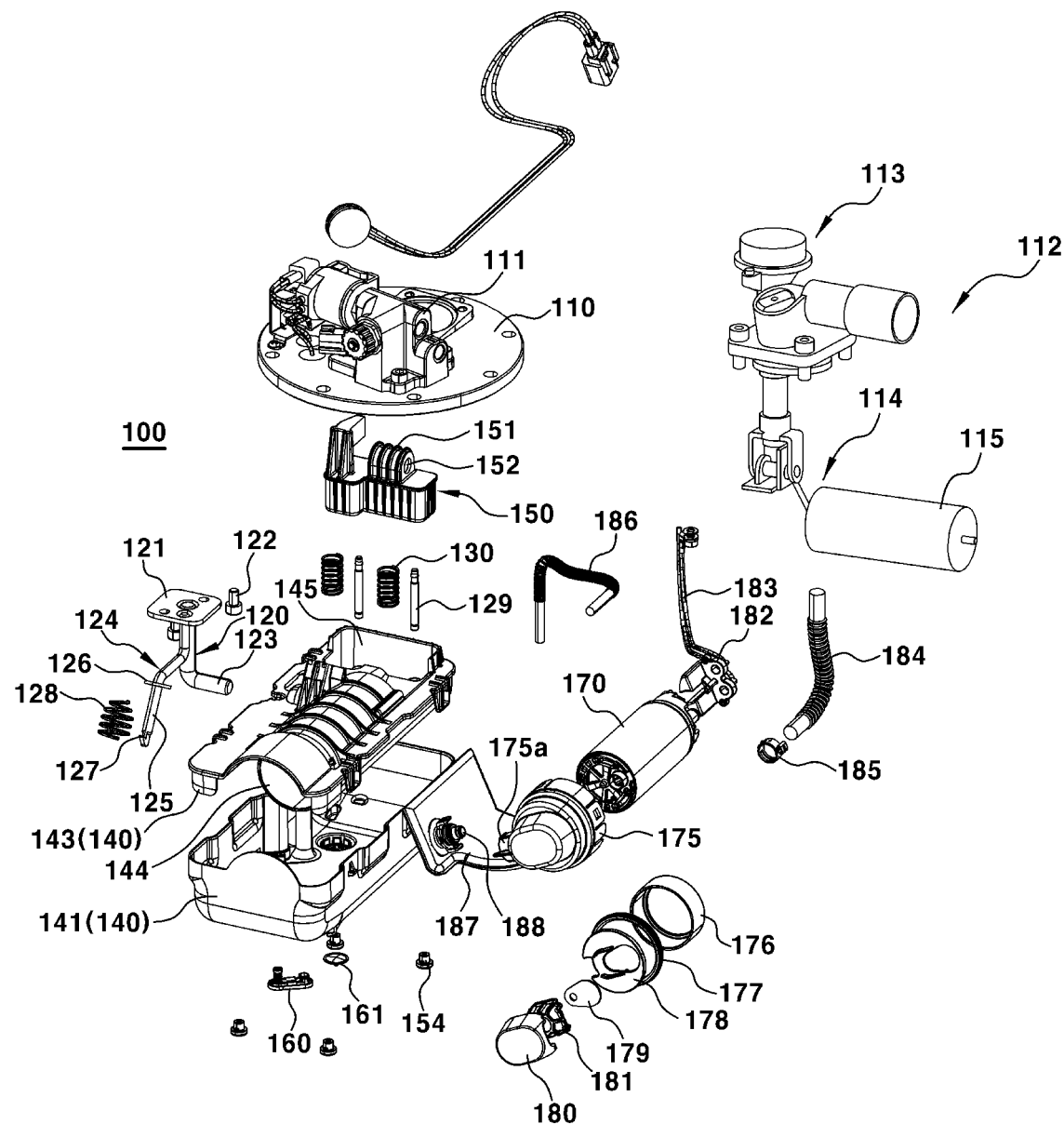
FIG. 3 is an exploded perspective view of the fuel pump module according to various exemplary embodiments of the present invention.
Figure 4:
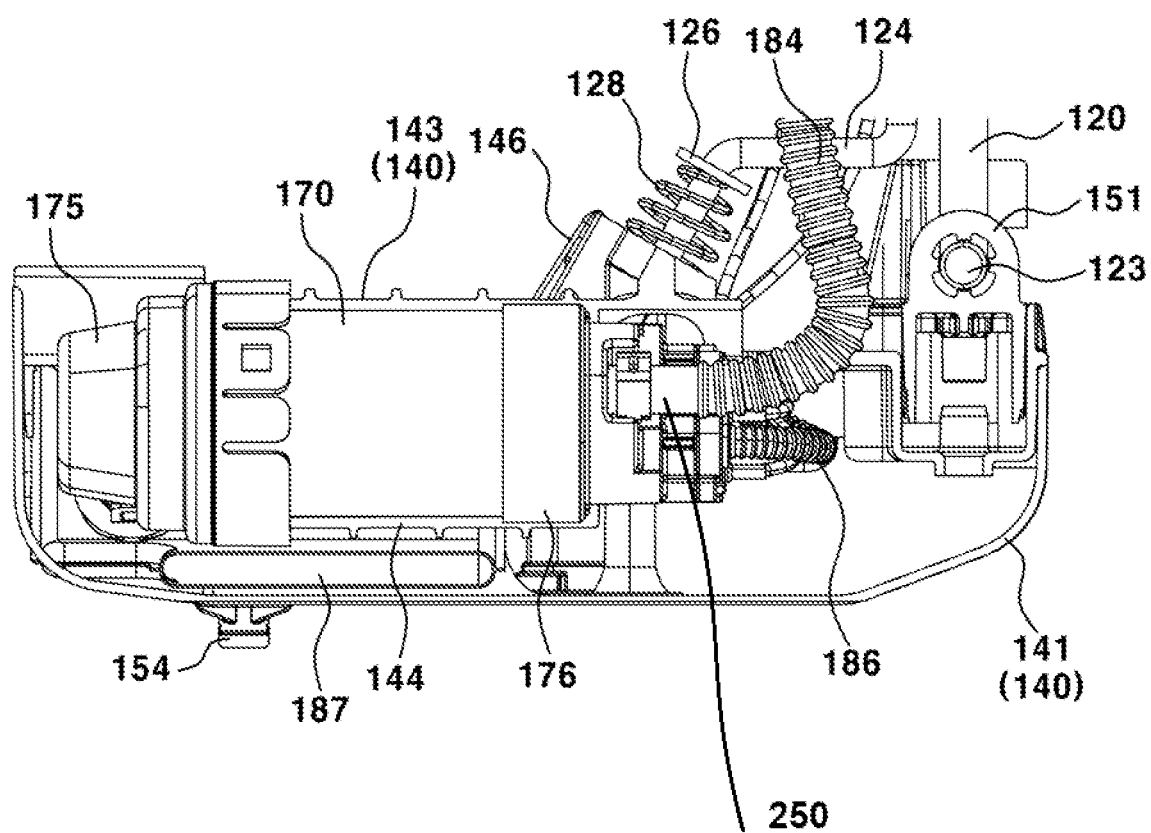
FIG. 4 is a cross-sectional view showing the internal configuration of a reservoir cup in the fuel pump module according to various exemplary embodiments of the present invention.

FIG. 1 is an assembled perspective view showing a fuel pump module according to various exemplary embodiments of the present invention and FIG. 2 is a cross-sectional view taken along line A-A shown in FIG. 1. FIG. 3 is an exploded perspective view of the fuel pump module according to various exemplary embodiments of the present invention and FIG. 4 is a cross-sectional view showing the internal configuration of a reservoir cup in the fuel pump module according to various exemplary embodiments of the present invention.

The present invention relates to an automotive fuel pump module, and more particularly, to an LPG pump module provided in an LPG bombe and pumping LPG in the LPG bombe to an engine.

The fuel pump module according to various exemplary embodiments of the present invention is a low profile fuel pump module which may be provided in a flat LPG bombe with a small height. That is, the fuel pump module has a small height, similar to the flat LPG bombe, to be configured to be provided in the flat LPG bombe (hereafter, referred to as a 'bombe') with a small height.

As shown in FIG. 1, FIG. 2, FIG. 3, and FIG. 4, a fuel pump module 100 according to various exemplary embodiments of the present invention includes a plate 110 mounted in an opening (designated by reference numeral 2 in FIG. 5) of a bombe (designated by reference numeral 1 in FIG. 5), a reservoir cup 140 connected to the plate 110 to be supported and disposed in the bombe 1, a jet pump 160 provided at the reservoir cup 140, and a fuel pump 170 mounted in the reservoir cup 140.

The opening in which the fuel pump module 100 is mounted is formed at a side of the bombe 1 so that an assembly of portions of the fuel pump module may be inserted and mounted in the bombe 1. Accordingly, it is possible to insert the portions of the fuel pump module 100 into the bombe 1 through the opening 2.

The plate 110 of the fuel pump module 100 is mounted and coupled to the opening 2 to seal the bombe 1 with the portions of the fuel pump module 100 inserted into the bombe 1.

The plate 110 is a member called a flange or a mounting member of an automotive fuel tank or the bombe 1, and a valve assembly 111 including one or more valves may be mounted on the top portion (external surface) of the plate 110. The valve assembly 111 may include a valve for preventing backflow or overflow, a valve for removing abnormal pressure in the bombe 1, or the like.

A pump controller may be further mounted on the top portion of the plate 110. A fuel hose 184 connected to a discharge port 250 of the fuel pump 170 may pass through the plate 110.

A gauge-inlet assembly 112 may be integrated with the plate 110. The gauge-inlet assembly 112 may be formed by combining an inlet portion 113 for injecting fuel into the bomber 1 and a fuel gauge 114 for detecting the remaining fuel amount in the bomber 1 with each other.

The fuel gauge 114 may be a float type gauge including a floater 115. The floater 115 of the fuel gauge 114 is positioned outside the reservoir cup 104 in the bombe 1 and is used to detect the remaining fuel amount in the bombe 1.

The plate 110 mounted in the opening 2 of the bombe 1 seals the bombe 1 and supports the portions of the fuel pump module 100, and the reservoir cup 140 and the fuel pump 170 are connected to the plate 110 to be supported.

The reservoir cup 140 is configured to be filled with fuel and the jet pump 160 provided at the reservoir cup 140 is supplied with some of fuel, which is pumped up by the fuel pump 170, as working fluid to suction the fuel outside the reservoir cup 140 and discharge the fuel into the reservoir cup 140.

There is substantially no difference in the installation purpose, the function, the use, etc. between the reservoir cup, the jet pump, and the fuel pump of the fuel pump module according to various exemplary embodiments of the present invention and those of fuel pump modules well known in the art.

However, in the fuel pump module according to various exemplary embodiments of the present invention, portions including the reservoir and the fuel pump are laterally laid and horizontally disposed, as shown in FIG. 1, FIG. 2, FIG. 3, and FIG. 4, rather than vertically erected and disposed up and down so that the height of the module may be reduced.

That is, as shown in the figures, in the fuel pump module 100 according to various exemplary embodiments of the present invention, the reservoir cup 140 has a height smaller than common reservoir cups. However, as the height is reduced, as described above, the reservoir cup 140 is laterally elongated to satisfy the necessary internal volume.

Referring to FIG. 4, it may be seen in the fuel pump module 100 according to various exemplary embodiments of the present invention that since the fuel pump 170 is horizontally laid in the reservoir cup 140, the height of the reservoir cup may be reduced. The fact that the fuel pump 170 is horizontally mounted in the reservoir cup 140 means that the shaft (motor's rotation shaft, designated by reference numeral 172 in FIG. 14) of a motor (designated by reference numeral 171 in FIG. 14) is horizontally elongated in the fuel pump 170.

In various exemplary embodiments of the present invention, the reservoir cup 140 may include a cup body 141 fixed in the bombe 1, a top cover 143 fixed to the cup body 141, and a retainer housing 150 coupled to the top cover 143. In the present configuration, the fuel pump 170 is disposed in the space between the cup body 141 and the top cover 143.

The cup body 141 of the reservoir cup 140 has a container shape with an internal space and the jet pump 160 may be provided in an intake port (designated by reference numeral 142 in FIG. 12) formed through the bottom portion of the cup body 141. Accordingly, the inside of the cup body 141 is filled with the fuel suctioned out of the cup body 141 and the discharged by the jet pump 160.

The cup body 141 of the reservoir cup 140 is supported by a plurality of bumpers 154 disposed on the bottom inside the bombe 1. The external bottom portion of the cup body 141 is supported by the bumpers 154 on the bottom inside the bombe 1.

The top cover 143 of the reservoir cup 140 has a shape that can seal the cup body 141 by covering the top portion of the cup body 141 and the fuel pump 170 is integrated inside the upper cover 143. To the present end, a cylindrical retainer 144 in which the fuel pump 170 may be horizontally inserted and fixed is integrally formed on the bottom portion of the top cover 143.

In various exemplary embodiments of the present invention, the top cover 143 may be provided in a full cover type that can seal the cup body 141 by covering most of the top portion of the cup body 141. When the top cover 143 is applied in a full cover type, it is possible to prevent the fuel in the reservoir cup 140 from overflowing and secure stability of fuel supply. Furthermore, since the reservoir cup 140 is sealed by the top cover 143, there is another advantage that the noise by the fuel pump 170 operating in the reservoir cup 140 may be blocked.

The fuel pump 170 is inserted in the retainer 144 integrally formed on the bottom portion of the top cover 143, whereby the fuel pump 170 may be coupled to the top cover 143. An inlet cover 175 is coupled to an end portion of the fuel pump 170 and is fastened to a first end portion of the retainer 144.

The inlet cover 175 provides a suction passage of fuel which is suctioned into the fuel pump 170 in the reservoir cup 140 when the fuel pump 170 is operated. An inlet 175 is formed on a side of the inlet cover 175. The inlet 175a of the inlet cover 175 communicates with an outlet 188 of a strainer 187. The intake port 142 of the fuel pump 170 is positioned inside the inlet cover 175.

Accordingly, when the fuel pump 170 is operated, the fuel in the reservoir cup 140 passes through the strainer 187 and then may be suctioned into the fuel pump 170 sequentially through the outlet 188 of the strainer 187 and the inlet 175a of the inlet cover 175 that are connected to each other.

The strainer 187 is a part that filters the fuel which is suctioned into the fuel pump 170, that is, a part that primarily filters out foreign substances in the fuel which is suctioned from the inside of the reservoir cup 140. In various exemplary embodiments of the present invention, the strainer 187 has a thin plate shape and is disposed under the fuel pump 170 and the retainer 144 in the cup body 141 of the reservoir cup 140.

Referring to FIG. 4, it may be seen that the strainer 187 which is a filter configured to remove foreign substances in fuel is disposed under the fuel pump 170 in the fuel pump module 100 according to various exemplary embodiments of the present invention. As shown in the figures, an integrated filtering unit in which the thin strainer 187 coupled to the fuel pump 170 through the inlet cover 175 is disposed under the fuel pump 170 in close contact with the bottom portion of the reservoir cup 140 is applied in the fuel pump module 100 according to various exemplary embodiments of the present invention, whereby it is possible to reduce the number of parts and decrease the entire size.

When the fuel pump 170 is operated and a suction force is applied to the fuel in the cup body 141, the fuel which is suctioned by the suction force flows into the strainer 187 and foreign substances in the fuel are removed. Thereafter, the fuel is suctioned into the fuel pump 170 from the strainer 187 through the outlet 188 of the strainer 187 and the inlet 175a of the inlet cover 175.

A plurality of parts that absorb and attenuate vibration, absorb shock, and block noise due to the fuel pump 170 is disposed between the retainer 144 and the fuel pump 170 and between the fuel pump 170 and the inlet cover 175. A first grommet 176 that attenuates vibration of the fuel pump may be provided at a second end portion of the fuel pump 170 where the discharge port is disposed.

The first grommet 176 is formed in a cylindrical shape and may be fitted between the external surface of the second end portion of the fuel pump 170 and the internal surface of the first end portion of the retainer 144. The first grommet 176 is made of a material that can attenuate vibration and absorb shock, for example, rubber.

An O-ring-shaped seal 177 for sealing, a second grommet 178 attenuating vibration of the fuel pump 170, an inlet filter 179 disposed in the intake port of the fuel pump 170 to remove foreign substances in fuel, a blocker 180 disposed around the intake port of the fuel pump 170 to noise of the fuel pump 170 inside the inlet cover 175, a shape maintainer 181 disposed in the blocker 180 to maintain the shape of the blocker 180, etc. may be disposed between the inlet cover 175 and the first end portion of the fuel pump 170 inserted in the inlet cover 175.

An end cap 182 is coupled to the second of the fuel pump 170 at which the first grommet 176 is provided, and a wire assembly 183 for supplying power between the end cap 182 and the plate 110 is connected to the end cap 182.

The discharge port 250 is formed at the second end portion of the fuel pump 170 and the connection hose 184 is connected to the discharge port 250, whereby the fuel discharged out of the discharge port 250 may be sent under pressure through the connection hose. The connection hose 184 is fastened to the discharge port 250 of the fuel pump 170 by a clamp 185, whereby it may be fixed. The connection hose 184 connected to the discharge port of the fuel pump 170 is, as described above, connected to a fuel supply line outside the bombe 1 through the plate 110.

Other than the connection hose 184, a jet hose 186 for supplying some of the fuel sent under pressure to the jet pump 160 as working fluid is connected to the discharge port for discharging fuel from the fuel pump 170. The jet hose 186 is connected to a working fluid supplier of the jet pump 160 from the fuel pump 170, supplying the fuel sent out of the fuel pump 170 to the working fluid supplier of the jet pump 160.

The jet pump 160 may be provided in the intake port 142 formed through the bottom portion of the reservoir cup 140 and a check valve 151 may be provided in the jet pump 160 at the intake port 142 of the reservoir cup 140 to prevent backflow.

Figure 5:
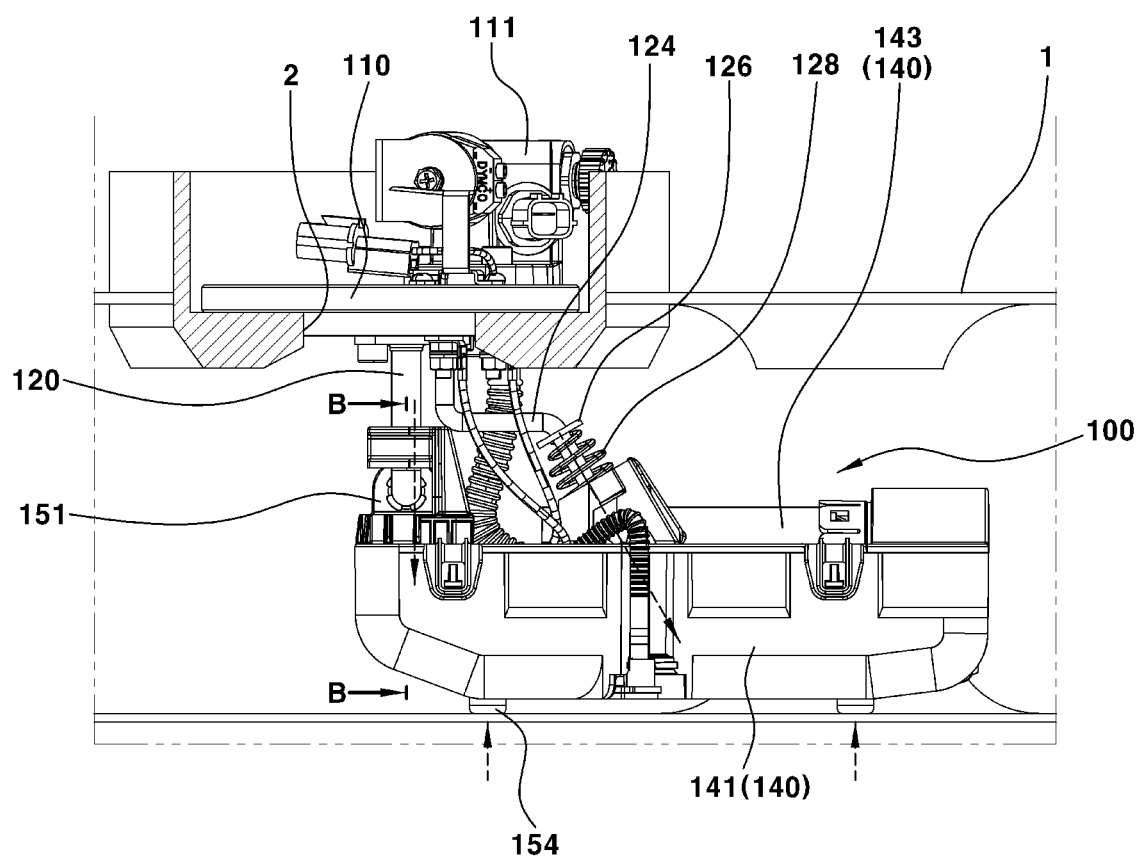
FIG. 5 is a cross-sectional view showing the fuel pump module according to various exemplary embodiments of the present invention provided in an LPG bombe.
Figure 6:
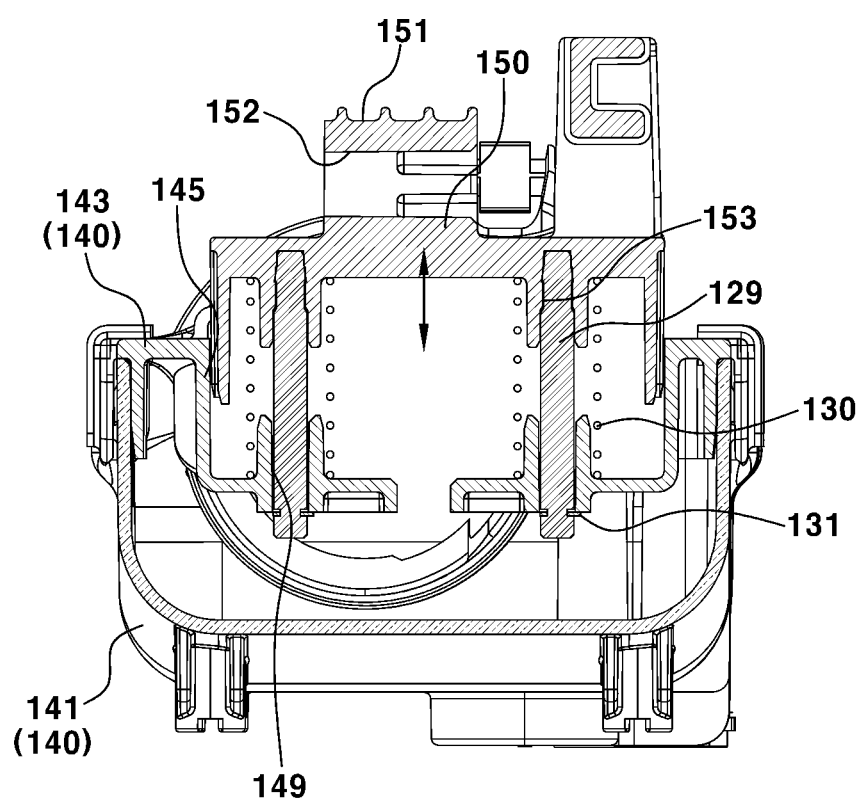
FIG. 6 is a cross-sectional view taken along line B-B shown in FIG. 5.

FIG. 5 is a cross-sectional view showing the fuel pump module according to various exemplary embodiments of the present invention provided in a bombe and FIG. 6 is a cross-sectional view taken along line B-B shown in FIG. 5.

As shown in the figures, the plate 110 of the fuel pump module 100 is provided to seal the opening 2 of the bombe 1, and the reservoir cup 140 and the fuel pump 170 connected to the bottom portion of the plate 110 are positioned in the bombe 1. A first support bar 120 is coupled to the bottom (inner surface) of the plate 110 to be integrally fixed.

A flange 121 may be formed at the upper end portion of the first support bar 120, as shown in FIG. 3, to fix the first support bar 120. The flange 121 formed at the upper end portion of the first support bar 120 is brought in contact with the bottom portion of the plate 110 and then the flange 121 of the first support bar 120 is fastened to the plate 110 by bolts 122, whereby the first support bar 120 may be fixed to the plate 110.

The first support bar 120 is elongated downwardly from the bottom portion of the plate 110 and connects the plate 110 and the reservoir cup 140 to each other. In detail, the first support bar 120 connects the plate 110 and a retainer housing 150 to each other. The retainer housing 150 is coupled to the top cover 143, whereby the support bar 120 is connected to the top cover 143 through the retainer housing 150.

As for the connection structure between the first support bar 120 and the retainer housing 150, as shown in FIG. 3, a hinge shaft portion 123 laterally bending is formed at the lower end portion of the first support bar 120. The hinge shaft portion 123 of the first support bar 120 is rotatably coupled to a coupling portion 151 protruding from the top portion of the retainer housing 150.

Referring to FIG. 6, it may be seen that the coupling portion 151 protrudes upwards from the top portion of the retainer housing 150 and a hinge hole 152 is formed through the coupling portion 151. The hinge shaft portion 123 of the first support bar 120 is inserted in the hinge hole 152 of the coupling portion 151, whereby the first support bar 120 is rotatably coupled to the retainer housing 150.

The entire reservoir cup 140 may be rotated about the hinge-coupling portion between the first support bar 120 and the retainer housing 150, that is, the hinge shaft portion 123 of the first support bar 120 and the hinge hole 152 of the retainer housing 150.

An accommodation groove 145 in which the retainer housing 150 may be inserted is formed at the top cover 143 of the reservoir cup 14, as shown in FIG. 6, so that the retainer housing 150 is fitted in the accommodation groove 145 to be able move up and down.

In various exemplary embodiments of the present invention, assuming that the entire shape of the reservoir cup 140 is elongated in one direction to have a predetermined length and the front and rear direction of the reservoir cup 140 is defined as the longitudinal direction of the reservoir cup 140, the accommodation groove 145 may be formed at the rear end portion of the top cover 143, so that the retainer housing 150 may be coupled to the rear end portion of the top cover 143.

When the retainer housing 150 is coupled to the rear end portion of the top cover 143 in the front and rear longitudinal direction of the reservoir cup 140 and the first support bar 120 is rotatably coupled to the retainer housing 150, the direction in which the reservoir cup 140 is rotated about the hinge shaft portion 123 of the first support bar 120 fixed to the plate 110 may be the direction in which the front end portion of the reservoir cup 140 is rotated up and down about the rear end portion of the reservoir cup 140 where the hinge-coupling portion 151 coupled to the first support bar 120 is positioned in the reservoir cup 140.

When the hinge shaft portion 123 which is the lower end portion of the first support bar 120 is rotatably inserted in the hinge hole 152 of the retainer housing 150 coupled to the rear end portion of the top cover 143 of the reservoir cup 140 such that the entire reservoir cup 140 may be rotated about the hinge shaft portion 123 of the first support bar 120, a second support bar 124 may be coupled to the top cover 143 ahead of the first support bar 120 separately from the first support bar 120.

The second support bar 124 may be integrally formed with the first support bar 120 (see the example shown in FIG. 3) or may be integrally coupled to the bottom portion of the plate 110 separately from the first support bar 120 (see the example shown in FIG. 5). When the second support bar 124 is integrally coupled to the plate 110 separately from the first support bar 120, similar to the first support bar 120, a flange may be formed at the upper end portion of the second support bar 124 and the flange of the second support bar 124 may be fastened to the bottom portion of the plate 110 in contact with the bottom.

Although the second support bar 124 is integrally formed with the first support bar 120 and extends forward in the exemplary embodiment shown in FIG. 3, the second support bar 124 is coupled to the bottom portion of the plate 110 separately from the first support bar 120, as shown in FIG. 5. As described above, the second support bar 124 may be integrally formed with the first support bar 120 or may be coupled to the bottom portion of the plate 110 separately from the first support bar 120.

Referring to FIG. 3, the first support bar 120 is coupled to the plate 110 to substantially vertically extend from the plate 110, and the second support bar 124 diverges forward from a side of the first support bar 120. The second support bar 124 may have an inclined portion 125 extending forward from the first support bar 120, bending downward, and then extending at an angle.

A hook 127 is formed at the lower end portion of the second support bar 124 and the lower end portion having the hook 127 of the second support bar 124 is inserted in a coupling groove 147 formed on the top portion of the top cover 143. The coupling groove 147 may be formed at a fastening portion protruding upwards from the top portion of the top cover 143.

In various exemplary embodiments of the present invention, the fastening portion 1460 to which the lower end portion of the second support bar 124 is coupled is positioned ahead of the retainer housing 150 to which the lower end portion of the first support bar 120 is coupled in the front and rear longitudinal direction of the reservoir cup 140 on the top cover 143. That is, when the hinge point where the lower end portion of the first support bar 120 is rotatably coupled on the reservoir cup 140 is at the positions of the hinge shaft portion 123 of the first support bar 120 and the hinge hole 152 of the retainer housing 150, the fastening point where the lower end portion of the second support bar 124 is coupled on the reservoir cup 140 is positioned ahead of the hinge point of the first support bar 120.

Figure 8A:
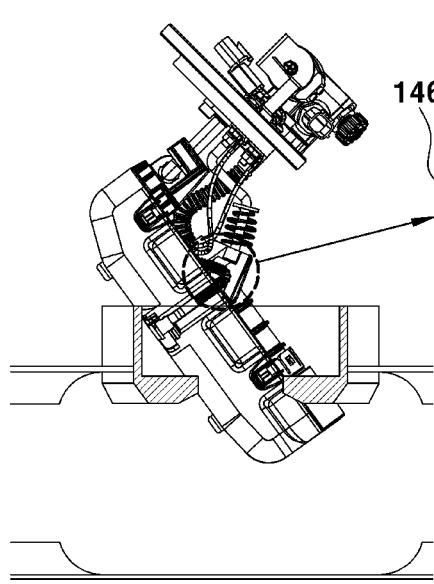
Figure 8B:
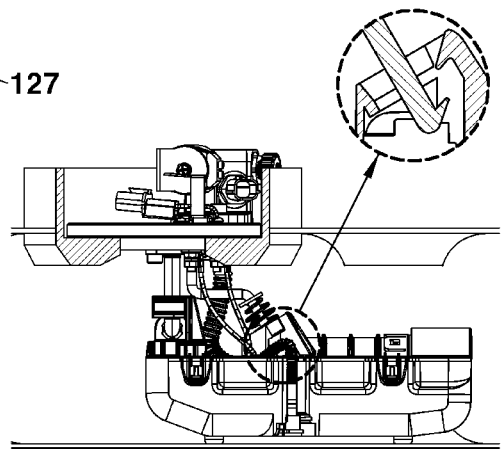

In various exemplary embodiments of the present invention, a stopper (designated by reference numeral 148 in FIG. 8) that can hold the hook 127 upward with the lower end portion of the second support bar 124 inserted in the coupling groove (designated by reference numeral 147 in FIG. 8) is formed on the internal surface of the coupling groove 147 of the fastening portion 146 of the top cover 143 (See FIG. 8).

Assuming that the portion bending downwardly from the second support bar 124 and then extending at an angle is referred to as an inclined portion 125, a spring support protrusion 126 is formed at the upper end portion of the inclined portion 125 and the hook 127 is formed at the lower end portion of the inclined portion 125.

When the lower end portion including the hook 127 of the inclined portion 125 is inserted in the coupling groove 147 of the top cover 143, a mounting spring 128 is mounted around the inclined portion 125 under the spring support protrusion 126 of the second support bar 124.

The mounting spring 128 is disposed around the inclined portion 125 of the second support bar 124 between the spring support protrusion 126 and the fastening portion 143 of the top cover 143. The elastic restoring force of the mounting spring 128 is applied such that the inclined portion 125 of the second support bar 124 protrudes out of the coupling groove 147 of the top cover 143.

In various exemplary embodiments of the present invention, the inclined portion 125 of the second support bar 124 reciprocates into and out of the coupling groove 147 of the top cover 143 when the reservoir cup 140 is rotated up and down about the hinge-coupling portion (the hinge shaft portion of the first support bar and the hinge hole of the retainer housing) between the lower end portion of the first support bar 120 and the retainer housing 150.

The hook 127 formed at the lower end portion of the inclined portion 125 is configured to be hooked to the stopper 148 in the coupling groove 147 in the direction in which the inclined portion 125 of the second support bar 124 protrudes out of the coupling groove 147 of the top cover 143. Accordingly, when the hook 127 is hooked to the stopper 148, the reservoir cup 140 is fixed not to rotate further about the hinge-coupling portion.

In the instant case the elastic restoring force of the mounting spring 128 (fitted around the second support bar) which is applied ahead of the hinge point of the first support bar 120 acts as a force that pushes downward the entire reservoir cup 140 including the top cover 143 from the plate 110 and the first support bar 120. Furthermore, the elastic restoring force of the mounting spring 128 is applied in the direction in which the hook 127 of the first support bar 120 is hooked to the stopper 148 in the hooking groove of the top cover 143.

In various exemplary embodiments of the present invention, when the plate 110 is fitted in the opening 2 of the bombe 1 and the bottom portion of the reservoir cup 140 (the external bottom portion of the cup body) is supported over the bottom inside the bombe 1 by the bumpers 154, the force of the mounting spring 128 fitted around the second support bar 124 acts as a force that brings the bottom portion of the reservoir cup 140 in close contact with the bottom inside the bombe 1 (see FIG. 5).

FIG. 7 and FIG. 8 are views showing a process of installing the fuel pump module according to various exemplary embodiments of the present invention in a bombe.

A process of mounting the fuel pump module 100 into the bombe 1 through the opening 2 is shown in FIG. 7. As shown in the figures, the front end portion of the reservoir cup 140 is inserted first into the opening 2 formed on the top portion of the bombe 1 and then the reservoir cup 140 is gradually pushed into the bombe 1 such that the reservoir cup 140 may be completely inserted into the bombe 1. Next, the plate 110 is bonded and fastened to the external surface of the bombe 1 around the opening 2. As the plate 110 is fixed in the opening 2 in the present way, the bombe 1 may be sealed.

As shown in FIG. 7, while the reservoir cup 140 is disposed into the bombe 1 through the opening 2, the reservoir cup 140 is rotated up and down about the hinge shaft portion 123 which is the lower portion of the first support bar 120. That is, while the reservoir cup 140 is inserted into the bombe 1 through the opening 2, the reservoir cup 140 is rotated downward such that the front end portion thereof is moved down with respect to the rear end portion of the reservoir cup 140 to which the first support bar 120 is coupled. With the entire reservoir cup 140 completely inserted in the bombe 1 through the opening 2, when the plate 110 is bonded and fastened to the external surface of the bombe 1 around the opening 2 after the reservoir cup 140 is accommodated on the bottom in the bombe 1, the reservoir cup 140 is rotated upward such that the front end portion to which the first support bar 120 is coupled is lifted upward with respect to the rear end portion.

As shown in FIG. 8, while the fuel pump module 100 is inserted into the bombe 1 through the opening 2 of the bombe 1, the entire reservoir cup 140 including the top cover 143 connected through the retainer housing 150 remains rotated downward with respect to the plate 110 and the first support bar 120, and in the instant case, the hook 127 of the second support bar 124 keeps hooked to the stopper 148 in the hooking groove of the top cover 143. In the present process, the hook 127 and the stopper 148 prevent the inclined portion 125 of the second support bar 124 from being fully pulled out of the hooking groove of the top cover 143.

Furthermore, after the reservoir cup 140 is completely inserted in the bombe 1, the bottom portion of the reservoir cup 140 is accommodated on the bottom inside the bombe 1 and the plate 110 is fitted in position in the opening 2. Thereafter, the inclined portion 125 of the second support bar 124 is inserted deeper in the coupling groove 147 of the top cover 143.

In the present state, the mounting spring 128 disposed between the spring support protrusion 126 of the second support bar 124 and the fastening portion 146 of the top cover 143 has been compressed. Furthermore, the elastic restoring force of the mounting sprint 128 acts as a force that pushes down the top cover 143 with respect to the first support bar 120 and the second support bar 124 fixed to the plate 110, that is, a force that brings the bottom portion of the reservoir cup 140 in close contact with the bottom inside the bombe 1.

FIG. 5 shows that the elastic restoring force of the mounting spring 128 supported by the spring support protrusion 126 of the second support bar 124 acts as a force which is applied downward to the fastening portion 146 of the reservoir cup 140 and brings the reservoir cup 140 in close contact with the bottom inside the bombe 1.

After the retainer housing 150 is fitted in the accommodation groove 145 of the top cover 143, as shown in FIG. 6, a third support bar 129 is disposed between the bottom (or the internal surface) of the retainer housing 150 and the bottom portion of the accommodation groove 145 of the top cover 143. The upper end portion of the third support bar 129 is inserted and fixed in a mounting groove 153 formed on the bottom portion of the retainer housing 150.

The third support bar 129 is elongated perpendicularly downwardly from the bottom portion of the retainer housing 150. The lower end portion of the third support bar 129 is slidably inserted through a hole 149 formed through the bottom portion of the accommodation groove 145 of the top cover 143. The upper end portion of the third support bar 129 is inserted and fixed in the mounting groove 153 of the retainer housing 150, but the lower end portion of the third support bar 129 is inserted through the hole 149 of the top cover 143 to be configured to slide up and down in the hole 149.

In various exemplary embodiments of the present invention, a plurality of third support bars 129 may be provided between the retainer housing 150 and the top cover 143. For example, as shown in FIG. 6, two third support bars 129 may be provided between the retainer housing 150 and the top cover 143 with a predetermined gap therebetween.

The upper end portion of each of the third support bars 129 is inserted and fixed in the mounting groove 153 formed on the bottom portion of the retainer housing 150 and the lower end portion is slidably inserted through the hole 149 formed through the bottom portion of the accommodation groove 145 of the top cover 143.

As described above, since the upper end portion of the third support bar 129 is fixed to the retainer housing 150, when the retainer housing 150 is moved up and down in the accommodation groove 145 of the top cover 143, the lower end portion of the third support bar 129 slides up and down in the hole 149 of the top cover 143.

A support spring 130 is provided around each of the third support bars 129 between the top cover 143 and the retainer housing 150. The support springs 130 are provided around the third support bars 129, respectively, elastically supporting the retainer housing 150 inside the top cover 143.

Accordingly, when the retainer housing 150 is moved up and down in the accommodation groove 145 of the top cover 143, the third support bars 129 slide up and down in the holes 149 of the top cover 143 and the support springs 130 may be compressed or restored between the retainer housing 150 and the top cover 143.

As described above, the retainer housing 150 is provided to be elastically supported by the support springs 130 inside the top cover 143, the retainer housing 150 may be elastically moved up and down in the accommodation groove 145 of the top cover 143.

As a result, shock may be absorbed up and down by elastic up and down movement of the retainer housing 150 between the plate 110 and the retainer housing 150 connected by the first support bar 120 and between the top cover 143 and the retainer housing 150 connected by the third support bars 129.

Furthermore, when the retainer housing 150 slides up and down in the accommodation groove 145 of the top cover 143, the third support bars 129 guide the retainer housing 150 while sliding up and down in the holes 149 of the top cover 143 such that the retainer housing 150 may be stably moved up and down.

In various exemplary embodiments of the present invention, the third support bar is inserted through the hole 149 of the top cover 143, a snap ring 131 is fixed at the lower end portion of the third support bar 129 positioned under the top cover 143. The snap ring 131 is larger in diameter than the hole 149 of the top cover 143, so when the snap ring 131 is disposed under the top cover 143, the snap ring 131 cannot pass through the hole 149 and is blocked upward by the top cover 143, whereby the third support bar 129 is prevented from being pulled up from the hole 149 of the top cover 143.

As a result, in the fuel pump module 100 according to various exemplary embodiments of the present invention, it is possible to move the reservoir cup 140 combined with the fuel pump 170 at various angles with respect to the plate 110 using the support bars, the spring, and the compression force and tension force (elastic restoring force) of the springs. Accordingly, it is possible to easily insert and assemble the reservoir cup 140 in the narrow internal space of the bombe 1 through the small opening 2.

The elastic restoring force of the mounting spring 128 acts as a force bringing the reservoir cup 140 in close contact with the bottom inside the bombe 1 and is uniformly distributed and applied to the reservoir cup 140. Accordingly, it is possible to effectively prevent the entire fuel pump module 100 including the reservoir cup 140 from separating from or coming off the bottom inside the bombe 1.

Referring to FIG. 5 and FIG. 6, in detail, in the fuel pump module 100 according to various exemplary embodiments of the present invention, as described above, the mounting spring 128 supported by the fastening portion 146 of the top cover 143 presses down the reservoir cup 140 at the fastening portion 146 which is a relatively forward position (see arrows in FIG. 5). Furthermore, the support springs 130 disposed between the retainer housing 150 and the top cover 143 press down the reservoir cup 140 through the top cover 143 at a relatively rearward position (see FIG. 6). Accordingly, the reservoir cup 140 may be uniformly in close contact with the bottom inside the bombe 1 (see arrows in FIG. 5).

Furthermore, since the fuel pump module 100 according to various exemplary embodiments of the present invention has a horizontal structure, the position where the lower end portion of the second support bar 124 is coupled to the top cover 143 may be variously changed in the front and rear longitudinal direction of the reservoir cup 140 and the length of the second support bar 124 can also be various changed. Furthermore, the angle of the inclined portion 125 of the second support bar 124 and the direction in which the inclined portion 125 is inserted into the coupling groove 147 of the top cover 143 may be variously changed.

Figure 9A:
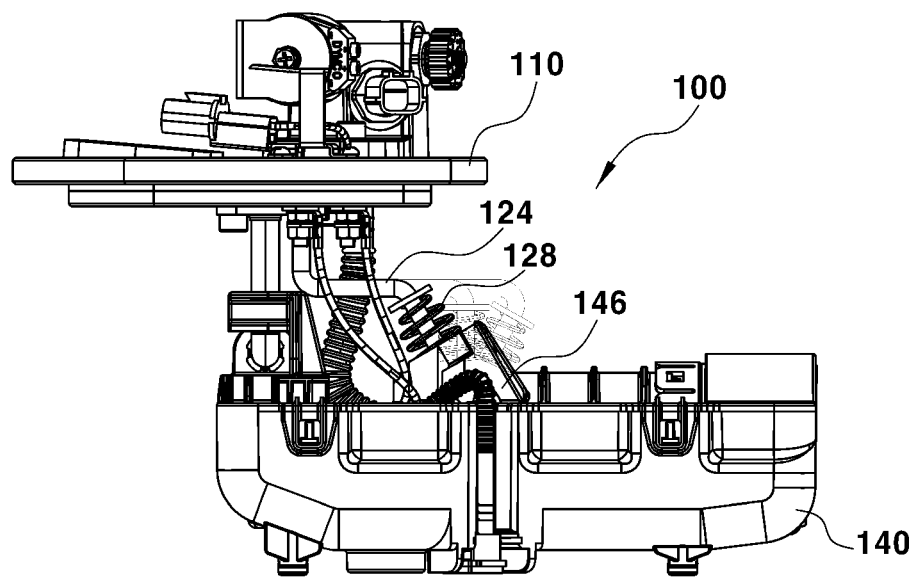
FIG. 9A, FIG. 9B and FIG. 9C are views showing several examples in which the position of a fastening portion of a reservoir cup to which a second support bar is coupled is changed in the fuel pump module according to various exemplary embodiments of the present invention.
Figure 9B:
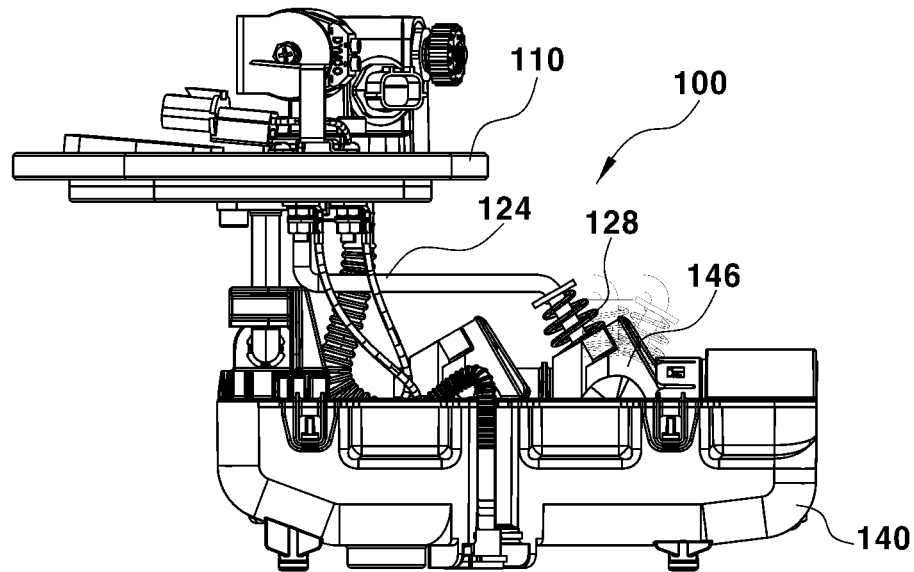
Figure 9C:
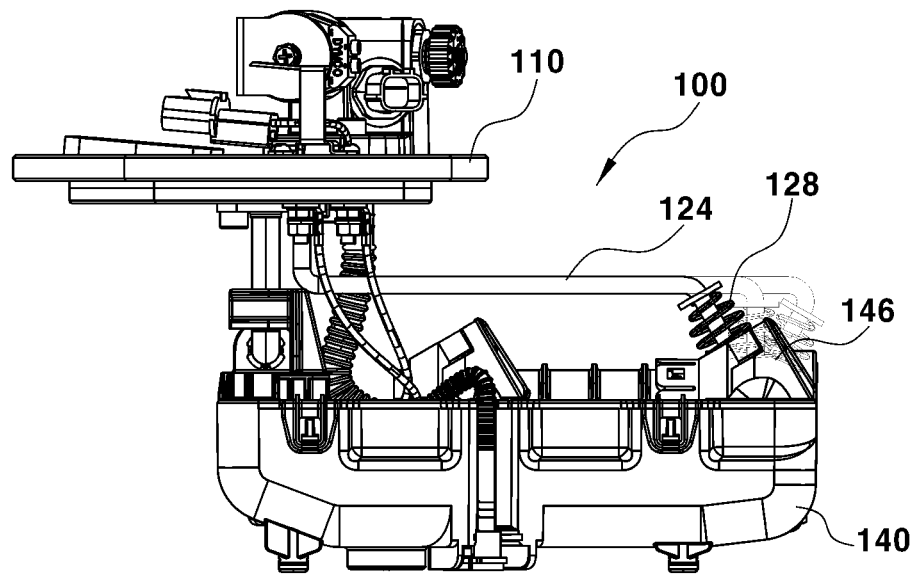

FIGS. 9A to 9C show several examples in which the position of the fastening portion 146 to which the lower end portion of the second support bar 124 is coupled is changed in the front and rear longitudinal direction of the reservoir cup 140 in the fuel pump module 100 according to various exemplary embodiments of the present invention.

Figure 10A:
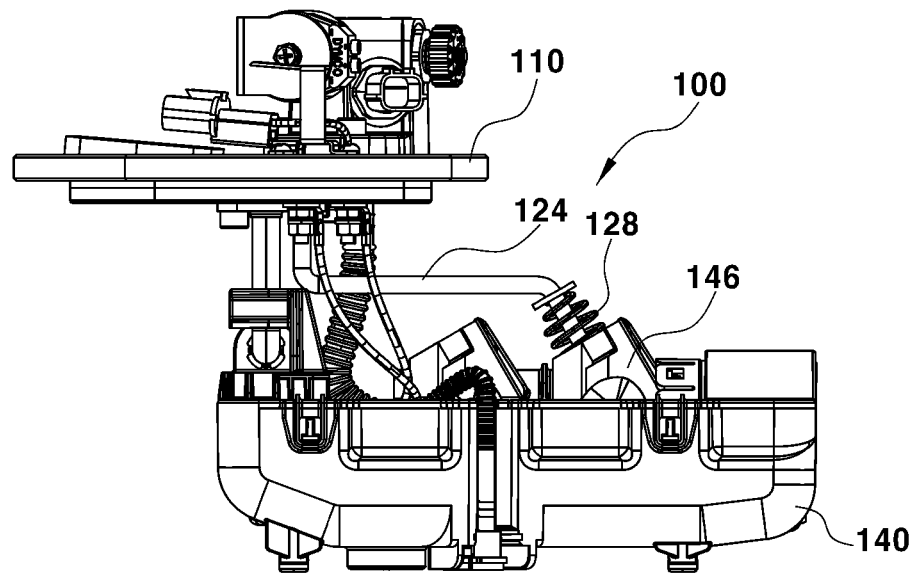
FIG. 10A, FIG. 10B and FIG. 10C are views showing several examples in which the second support bar is coupled to the reservoir cup at different angles in different directions in the fuel pump module according to various exemplary embodiments of the present invention.
Figure 10B:
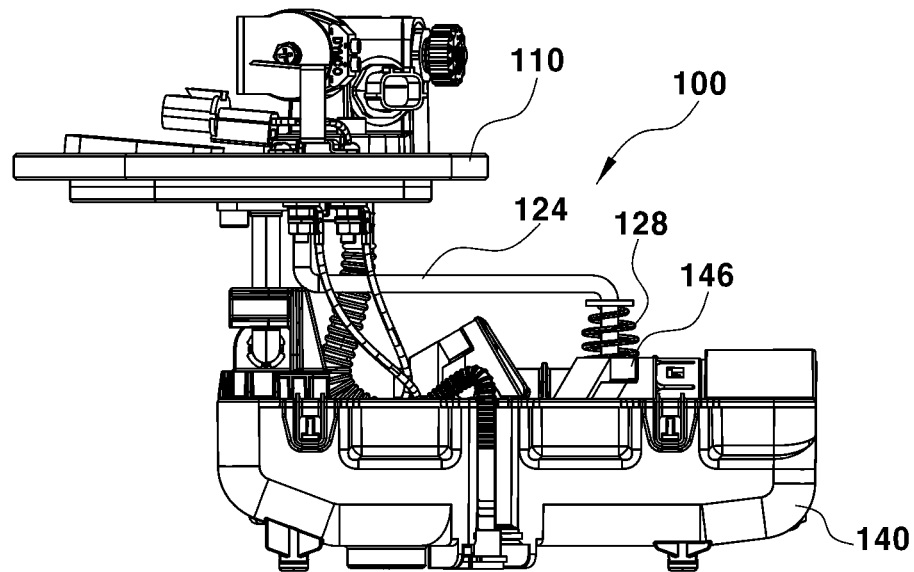
Figure 10C:
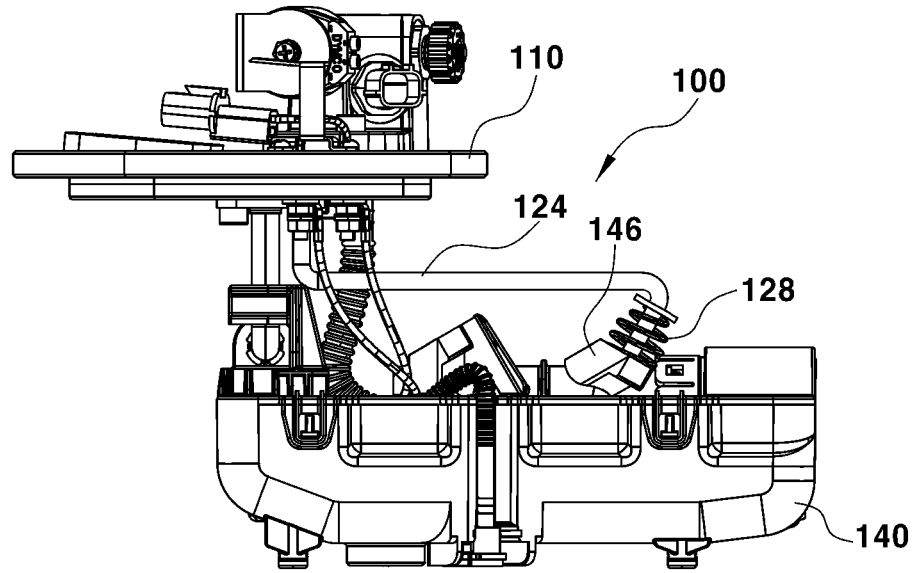

FIG. 10A, FIG. 10B and FIG. 10C show several examples in which the angle and the direction when the lower end portion of the second support bar 124 is coupled to the fastening portion 146 of the reservoir cup 140 (top cover) are different in the fuel pump module 100 according to various exemplary embodiments of the present invention.

As described above, the second support bar 124 may be coupled to the fastening portion 146 of the reservoir cup 140 (top cover) with various lengths and at various angles in accordance with the mounting condition of the fuel pump module 100, whereby it is possible to conveniently assemble and mount the fuel pump module 100.

Figure 11:
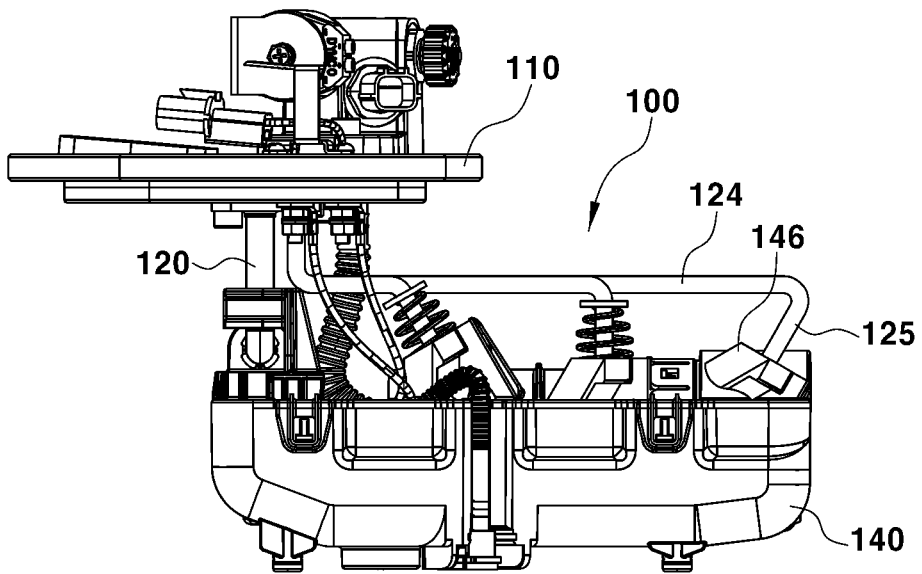
FIG. 11 is a view showing an example in which a mounting spring of the fuel pump module according to various exemplary embodiments of the present invention may be removed.

FIG. 11 is a view showing an example in which a mounting spring of the fuel pump module 100 according to various exemplary embodiments of the present invention may be removed. As shown in the figure, the second support bar 124 may be coupled to the fastening portion 146 formed at the front portion of the reservoir cup 140 (top cover), and in the instant case, the inclined portion of the second support bar 124 may be inclined rearward and downward.

In the present example, the first support bar 120 supports the rear portion of the reservoir cup 140 and the second support bar 124 supports the front portion of the reservoir cup 140. As a result, the first support bar 120 and the second support bar 124 fixed to the plate 110 stably support and fix the rear portion and the front portion of the reservoir cup 140, respectively, the mounting spring 128 disposed around the inclined portion 125 of the second support bar 124 may be removed.

The second support bar 124 connecting the plate 110 and the top cover 143 of the reservoir cup 140 may be provided as several pieces. When the lengths of the first support bar 120 and the second support bar 124 are increased, the distance between the plate 110 and the reservoir cup 140 may be increased.

As described above, when the lengths of the first support bar 120 and the second support bar 124 are increased, the fuel pump module 100 according to various exemplary embodiments of the present invention may be mounted in existing bombes having a large height in addition to the flat bombe 1. Accordingly, the fuel pump module may be shared regardless of the kinds of vehicles.

Figure 12:
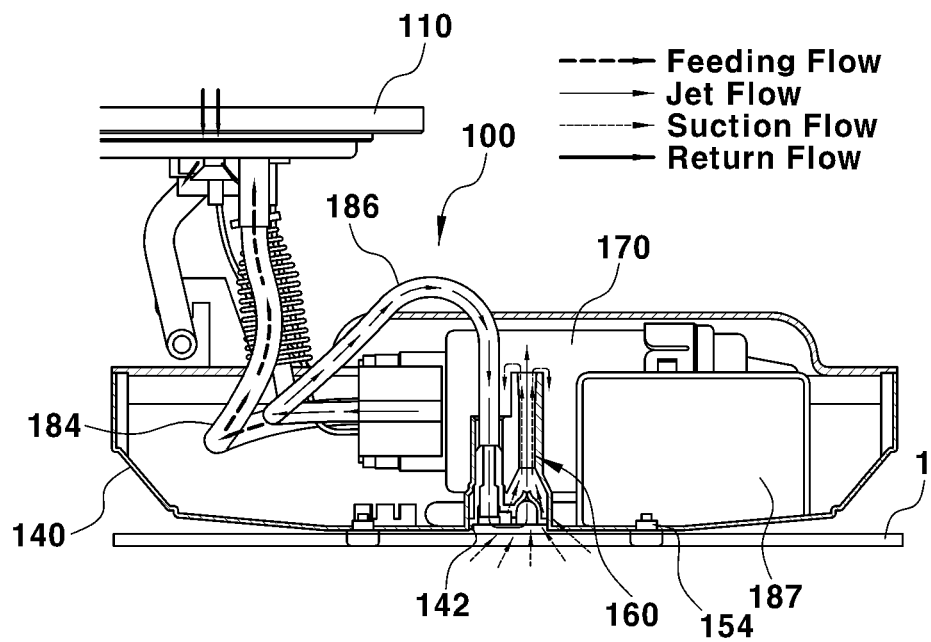
FIG. 12 is a view showing a cross-sectional structure at a position where a jet pump is provided in the fuel pump module according to various exemplary embodiments of the present invention.

FIG. 12 is a view showing a cross-sectional structure at a position where the jet pump 160 is provided in the fuel pump module 100 according to various exemplary embodiments of the present invention. As shown in the figure, the jet pump 160 may be provided in the intake port 142 formed through the bottom portion of the reservoir cup 140.

Since the jet pump 160 is provided in the bottom portion of the reservoir cup 140, the reservoir cup 140 can keep fully filled with fuel until the fuel amount in the bombe 1 reaches an unavailable remaining amount. In various exemplary embodiments of the present invention, the reservoir cup 140 has a shape reduced in height and laterally expanded, that is, a flat shape in comparison to the related art.

Since the bombe 1 can also have a shape reduced in height and laterally expanded, that is, a flat shape, it is possible to height of the unavailable remaining amount at which fuel cannot be suctioned in to the reservoir cup 140 by the jet pump 160 in the bombe 1. That is, fuel may be suctioned into the reservoir cup 140 by the jet pump 160 even though the height of fuel in the bombe 1 is smaller than that in the related art.

Figure 13:
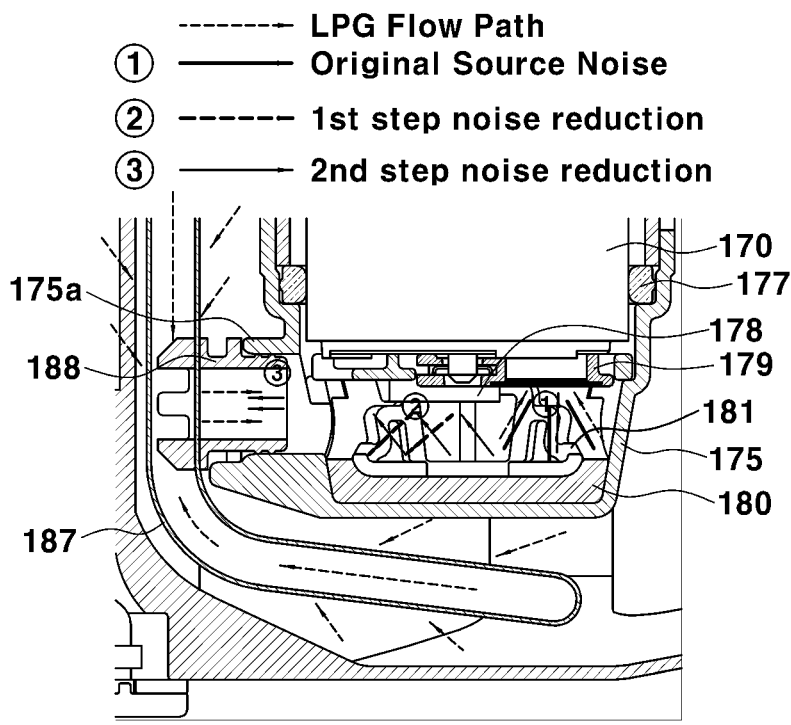
FIG. 13 is a view showing the path of fuel flowing into a fuel pump through a strainer and an inlet cover in the fuel pump module according to various exemplary embodiments of the present invention.

FIG. 13 is a view showing a path through which fuel flows into the fuel pump 170 through the strainer 187 and the inlet cover 175 in the fuel pump module 100 according to various exemplary embodiments of the present invention. As shown in the figure, the inlet 175a of the inlet cover 175 is coupled to the outlet 188 of the strainer 187, and the seat 177 for sealing and the second grommet 178 for attenuating vibration of the fuel pump 170 are provided inside the inlet cover 175.

The hole of the second grommet 178 and the intake port 142 of the fuel pump 170 communicate with each other and the inlet filter 179 that removes foreign substances in fuel by filtering the fuel is provided in the hole of the second grommet 178. The blocker 180 that blocks noise of the fuel pump 170 is provided inside the inlet cover 175, and the shape maintainer 181 that maintains the shape of the blocker 180 is provided inside the blocker 180.

In the present configuration, when the fuel pump 170 is operated, the fuel in the reservoir cup 140 is sent into the strainer 187 and then suctioned into the inlet cover 175. In the present process, the fuel may be filtered by the strainer 187 and the fuel with foreign substances removed may be suctioned into the inlet cover 175.

Pump noise discharged through the intake port 142 of the fuel pump 170 is blocked by the blocker 180 provided inside the inlet cover 175. That is, the pump noise is gradually reduced through the blocker 180, so little pump noise is transmitted to the outside of the inlet cover 175.

Figure 14A:
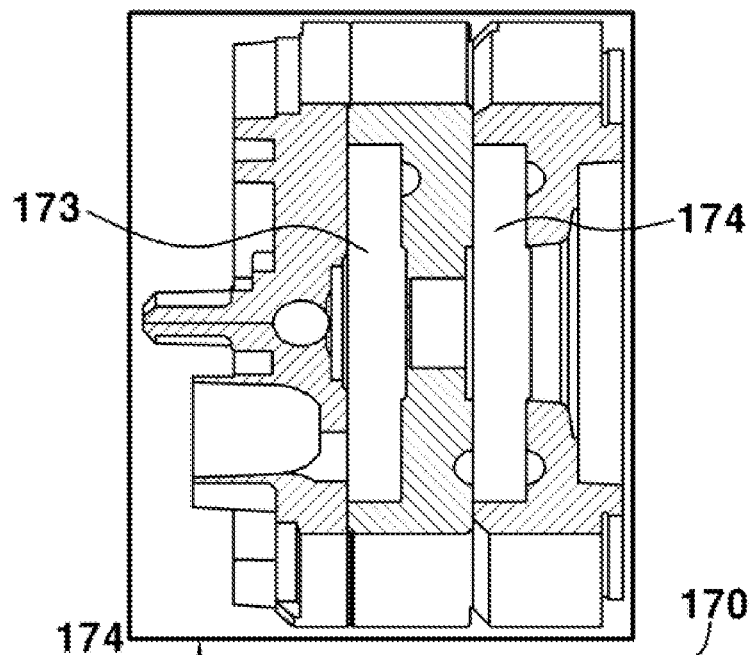
FIG. 14 is a cross-sectional view showing the internal configuration of the fuel pump in the fuel pump module according to various exemplary embodiments of the present invention.
Figure 14B:
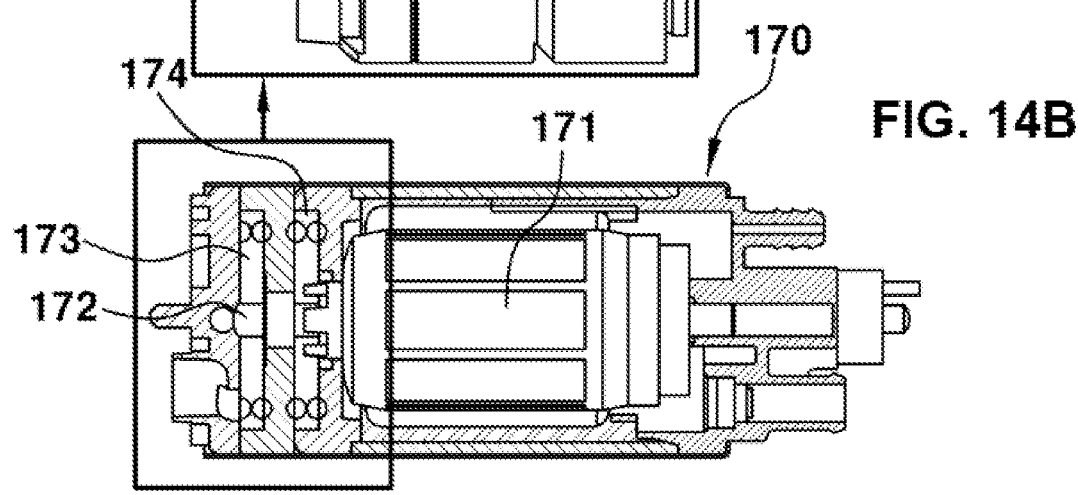

FIG. 14 is a cross-sectional view showing the internal configuration of the fuel pump 170 in the fuel pump module 100 according to various exemplary embodiments of the present invention. A turbine type fuel pump 170 that pumps fuel by rotating impellers 173 and 174 rather than compressing and pumping fuel using a plunger which is reciprocated by a cam is applied to the fuel pump module 100 according to various exemplary embodiments of the present invention.

The fuel pump which is used in common LPG vehicles is configured to pump fuel by reciprocating a plunger. That is, when a shaft is rotated by a motor, a cam-shaped member eccentrically formed on the shaft straightly reciprocates the plunger by rotating and a diaphragm is operated by the plunger straightly reciprocating, whereby fuel is suctioned and discharged outside.

However, a turbine type fuel pump 170 that suctions fuel and the sends the fuel under pressure using a suction force generated by rotating impeller 173 and 174 mounted on a shaft (motor shaft) 172 of the motor including a stator and a rotor is applied to the present invention. In the instant case, as shown in FIG. 14, a double-impeller type having two impellers 173 and 174 on one shaft 172 may be applied.

That is, fuel suctioned by one impeller 173 is suctioned again by the other impeller 174 and is then finally discharged, so that the fuel sequentially passes through the two impellers 173 and 174. In the instant case, two impellers 173 and 174 having different numbers of blades may be mounted in the fuel pump 170, and accordingly, it is possible to prevent amplification of noise generated by the pump.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fuel pump module comprising:
   a plate configured to be mounted in an opening of a bombe;
   a reservoir cup provided in the bombe;
   a fuel pump mounted in the reservoir cup and supplying fuel into the reservoir cup;
   a jet pump supplied with the fuel from the fuel pump as working fluid to suction the fuel outside the reservoir cup and discharge the fuel into the reservoir cup;
   a first support bar having a first end portion fixed by the plate and a second end portion rotatably coupled to the reservoir cup; and
   a second support bar having a first end portion fixed by the plate and a second end portion inserted in a coupling groove of the reservoir cup,
   wherein the reservoir cup includes:
   a cup body for keeping the fuel therein;
   a top cover provided to cover a top portion of the cup body; and
   a retainer housing inserted in an accommodation groove formed on the top cover, and
   wherein the second end portion of the first support bar is rotatably coupled to the retainer housing.

2. The fuel pump module of claim 1, wherein an inlet cover providing a suction passage through which the fuel in the reservoir cup is suctioned is coupled to a first end portion of the fuel pump at which an intake port of the fuel pump is positioned.

3. The fuel pump module of claim 2, wherein a cylindrical retainer in which the fuel pump is horizontally inserted and accommodated is integrally formed on a bottom portion of the top cover.

4. The fuel pump module of claim 3, wherein the inlet cover is coupled and fixed to the cylindrical retainer.

5. The fuel pump module of claim 3, wherein a first grommet for reducing vibration is fitted between the retainer and a second end portion of the fuel pump at which a discharge port is positioned.

6. The fuel pump module of claim 2, wherein a seal for sealing, a second grommet disposed to attenuate vibration of the fuel pump, and an inlet filter disposed in the intake port of the fuel pump and configured to remove foreign substances in fuel are disposed between the first end portion of the fuel pump and the inlet cover.

7. The fuel pump module of claim 6,
   wherein a blocker configured for blocking noise of the fuel pump is disposed inside the inlet cover to surround the intake port of the fuel pump, and wherein a shape maintainer maintaining a shape of the blocker is fitted in the blocker.

8. The fuel pump module of claim 1,
wherein the retainer housing is disposed in the accommodation groove of the top cover to slide up and down therein, and
wherein a third support bar guiding the retainer housing moving upwards and downwards and a support spring elastically supporting the retainer housing inside the top cover are disposed between the retainer housing and the top cover.

9. The fuel pump module of claim 8,
wherein a mounting groove is formed on the retainer housing,
wherein a hole is formed through the top cover,
wherein an upper end portion of the third support bar is fixed in the mounting groove, and
wherein a lower end portion of the third support bar is slidably inserted through the hole of the cover.

10. The fuel pump module of claim 1,
wherein the first end portion of the first support bar is directly fixed to the plate,
wherein the first end portion of the second support bar is integrally connected to the first support bar, and
wherein the second support bar diverges from the first support bar.

11. The fuel pump module of claim 1, wherein the first support bar and the second support bar are individual support bars separately fixed at the first end portions of the first support bar and the second support bar to the plate.

12. The fuel pump module of claim 1,
wherein a fastening portion protrudes from a top portion of the reservoir cup,
wherein a coupling groove is formed in the fastening portion, and
wherein the second support bar has an inclined portion extending at an angle with respect to a longitudinal axis of the second support bar and inserted in the coupling groove.

13. The fuel pump module of claim 1,
wherein a fastening portion protrudes from a top portion of the reservoir cup,
wherein a coupling groove is formed in the fastening portion,
wherein a hook is formed at the second end portion of the second support bar inserted in the coupling groove, and
wherein a stopper is formed inside the coupling groove to lock the hook in a direction in which the second end portion of the second support bar is pulled out of the coupling groove.

14. The fuel pump module of claim 13, further including:
a mounting spring provided between the second support bar and the reservoir cup and providing an elastic restoring force to the reservoir cup to push the reservoir cup to the bombe,
wherein a spring support protrusion is formed on the second support bar, and
wherein the mounting spring is disposed around the second support bar to be compressed between the spring support protrusion of the second support bar and the fastening portion of the reservoir cup.

15. The fuel pump module of claim 1, further including:
a mounting spring provided between the second support bar and the reservoir cup and providing an elastic restoring force to the reservoir cup to push the reservoir cup to the bombe.

16. The fuel pump module of claim 1,
wherein the reservoir cup is formed in a long shape having a horizontally predetermined length, and
wherein a longitudinal axis of the fuel pump is horizontally laid in the reservoir cup.

17. The fuel pump module of claim 1,
wherein when a front and rear direction of the reservoir cup is defined as a longitudinal direction of the reservoir cup,
a location of the coupling groove of the reservoir cup to which the second support bar is coupled is positioned ahead of a hinge-coupling portion between the first support bar and the reservoir cup.

18. The fuel pump module of claim 17, wherein the hinge-coupling portion between the first support bar and the reservoir cup is positioned at a rear portion of the reservoir cup.

19. The fuel pump module of claim 1, wherein the fuel pump is a turbine type fuel pump including two impellers on a shaft for outputting torque of a motor, the two impellers having different numbers of blades.

* * * * *